US007328916B2

United States Patent
Tajima et al.

(10) Patent No.: US 7,328,916 B2
(45) Date of Patent: Feb. 12, 2008

(54) KNEE PROTECTION SYSTEM

(75) Inventors: Hiroyuki Tajima, Aichi-ken (JP);
Takahiko Sato, Aichi-ken (JP);
Akiyoshi Nagano, Aichi-ken (JP);
Masakazu Hashimoto, Aichi-ken (JP);
Osamu Fukawatase, Aichi-ken (JP);
Takeaki Kato, Aichi-ken (JP);
Hiroyoshi Yamaguchi, Yokohama (JP);
Tadanori Hisamoto, Yokohama (JP);
Shinichi Horibata, Yokohama (JP)

(73) Assignees: Toyota Jidosha Kabushiki Kaisha, Aichi-ken (JP); NHK Spring Co., Ltd., Kanagawa-ken (JP)

( * ) Notice: Subject to any disclaimer, the term of this patent is extended or adjusted under 35 U.S.C. 154(b) by 338 days.

(21) Appl. No.: 11/085,230

(22) Filed: Mar. 22, 2005

(65) Prior Publication Data

US 2005/0218641 A1    Oct. 6, 2005

(30) Foreign Application Priority Data

Mar. 29, 2004    (JP)    ............................... 2004-096413

(51) Int. Cl.
*B60R 21/045*    (2006.01)
(52) U.S. Cl. .................................................. 280/753
(58) Field of Classification Search ................ 280/751, 280/752, 753
See application file for complete search history.

(56) References Cited

U.S. PATENT DOCUMENTS 5,131,681 A      7/1992  Wetzel et al.
6,641,166 B2 *  11/2003  Browne et al. ............. 280/752
6,793,246 B2 *   9/2004  Horsch ........................ 280/751
7,159,685 B2 *   1/2007  Knight-Newbury et al. 180/274
2005/0194773 A1 * 9/2005  Yamada et al. ............. 280/752

FOREIGN PATENT DOCUMENTS

JP    A-HO4-278858    10/1992

\* cited by examiner

*Primary Examiner*—Paul N. Dickson
*Assistant Examiner*—Joseph Rocca
(74) *Attorney, Agent, or Firm*—Posz Law Group, PLC

(57) ABSTRACT

In a knee protection system according to the present invention, a knee protection panel is driven from a standby position surrounded by an interior member to the vehicle rear side to a knee-protecting position in front of the knees of an occupant by a drive mechanism when the vehicle is crashing, whereby the knees moving forward are protected by the knee protection panel thus driven. The drive mechanism includes a holding portion for holding the knee protection panel in such a manner that the knee protection panel is moved rearward. Engagement portions are provided, respectively, at locations where the holding portion and the knee protection panel connect with each other in such a manner as to be brought into engagement with each other. These engagement portions are brought into engagement with each other when the holding portion is moved rearward due to the activation of the drive mechanism in such a manner as to prevent displacement of the knee protection panel relative to the holding portion while moving the knee protection panel rearward, as well as allowing the knee protection panel to be displaced vertically and horizontally relative to the holding portion prior to the activation of the drive mechanism. With the knee protection system according to the invention, the knee protection panel can be disposed at the standby position so as to have a visually attractive break with the surrounding interior member, without deteriorating mounting work efficiency.

11 Claims, 12 Drawing Sheets

KNEE PROTECTION SYSTEM

The present application claims priority from Japanese Patent Application No. 2004-96413 of Tajima et al, filed on Mar. 29, 2004, the disclosure of which is hereby incorporated into the present application by reference.

BACKGROUND OF THE INVENTION

1. Field of the Invention

The present invention relates to a knee protection system which can protect with a knee protection panel the knees of an occupant of a vehicle which move forward at the time of collision of the vehicle. When the vehicle is colliding, the knee protection panel is driven towards the rear of the vehicle from a standby position, where it is surrounded by vehicle interior member, by a driving mechanism so as to be disposed in front of the knees of the occupant.

2. Description of Related Art

Conventionally, as such knee protection systems, there is a knee protection system described in JP-A-4-278858. In this knee protection system, when a vehicle comes into collision, a servo drive mechanism is activated to drive a knee protection panel rearward for protection of the knees of an occupant of the vehicle which move forward.

In the conventional system, however, the knee protection panel itself is strongly connected to a movable portion which is adapted to move rearward when the servo drive mechanism is activated. Due to this, with a construction in which the knee protection panel is accommodated in such a manner as to be surrounded by vehicle interior member when in the standby position before the activation of the knee protection system, the following problem has been caused.

Namely, in order to allow the drive mechanism to hold the knee protection panel which is driven rearward to thereby stop motion of the knees when the drive mechanism is completely activated, the drive mechanism needs to be strongly mounted on the vehicle body. On the other hand, a visually attractive break needs to be provided between the knee protection panel and the interior member in the standby state before the knee protection system is activated. Namely, the knee protection panel needs to aligned with the interior member when in the standby state. However, since the interior member is formed from synthetic resin or the like, a dimensional error tends to be easily produced in the fitting of the interior member to the vehicle body. Due to this, with the knee protection panel being strongly connected to the drive mechanism, which is fixed to the vehicle body, when the knee protection system is mounted on the vehicle, various adjustments need to be performed for various components including the knee protection panel so as to have a visually attractive break between the knee protection panel and the interior member. As a result, the mounting work efficiency of such a knee protection system is deteriorated.

SUMMARY OF THE INVENTION

The invention was made with a view to solving the above problem, and an object thereof is to provide a knee protection system in which a knee protection panel can be disposed at a standby position while having a visually attractive break between the knee protection panel and the interior member without deteriorating the mounting work efficiency.

According to the invention, there is provided a knee protection system for protecting the knees of an occupant of a vehicle which move forward when the vehicle is in collision, including a knee protection panel for restraining the knees from moving forward, vehicle interior member disposed in such a manner as to surround the knee protection panel, a drive mechanism, a holding portion and engagement portions. The drive mechanism drives the knee protection panel to the rear of the vehicle from the standby position of the knee protection panel surrounded by the interior member so as to be disposed at a protecting position situated in front of the knees of the occupant when the vehicle is colliding. The holding portion is provided on the drive mechanism so as to hold the knee protection panel so that the knee protection panel can be moved rearward. The engagement portions are disposed at both the holding portion and the knee protection panel, where the two connect. Then, when the holding portion is moved rearward in association with the activation of the drive mechanism, the engagement portions are brought into engagement with each other to thereby prevent the displacement of the knee protection panel relative to the holding portion so that the knee protection panel is moved rearward. In addition, the engagement portions permit the knee protection panel to move and be displaced either in the vertical direction or in the horizontal direction or both relative to the holding portion before the drive mechanism is activated.

In the knee protection system according to the invention, the engagement portions of the holding portion on the drive mechanism side and the knee protection panel are not in engagement with each other before the drive mechanism is activated. Due to this, the knee protection panel can be moved either in the vertical direction or in the horizontal direction or both, whereby the knee protection panel can be displaced relative to the drive mechanism which is fixed to the vehicle body side so as to provide a visually attractive break between the knee protection panel and the interior member. As a result, the mounting work of the drive mechanism and the knee protection panel on the vehicle can be made more efficient.

Then, when the knee protection system is activated, the engagement portions at the holding portion on the drive mechanism side and those at the knee protection panel are, of course, brought into engagement with each other, whereby the holding portion holds the knee protection panel and prevents any displacement, so that the knee protection panel is made to move rearward to the protecting position where the knees can be protected.

Consequently, in the knee protection system according to the invention, the knee protection panel can be disposed at the standby position so as to have a visually attractive break between the knee protection panel and the interior member without deteriorating the mounting work efficiency.

In addition, the engagement portions disposed at the locations where the holding portion and the knee protection panel connect with each other are preferably constructed to have guide portions which cause the engagement portions to engage with each other at their centers when the engagement portions are brought into engagement with each other. In such a construction, even in the event that the centers of the engagement portions are displaced from each other as a result of the knee protection panel being displaced from the drive mechanism so as to provide a visually attractive break between the knee protection panel and the interior member in the standby state occurring before the knee protection system is activated, the engagement portions can be guided by the guide portion so that the centers of the respective engagement portions can be aligned with each other when the knee protection system is activated. Thus, the knee protection panel is held in the proper position by the holding portion when the engagement portions are brought into engagement with each other. As a result, even when the knee protection panel stops motion of the knees, the knee protection panel is held stably, thereby protecting the knees properly.

Note that the knee protection panel can be constructed so as to include, for example, an impact absorbing portion which plastically deforms so that its longitudinal thickness is reduced, and a front surface portion for supporting the impact absorbing portion on its front side. In the knee protection panel that is so constructed, when the knee protection panel stops the motion of the knees, the impact absorbing portion, which is supported on the front side thereof, is made to deform plastically so as to absorb the kinetic energy of the knees.

In addition, the knee protection system desirably includes an alignment means for connecting the knee protection panel to the interior member in such a manner that the rear surface of the knee protection panel becomes flush with the rear surface of the interior member. For example, the alignment means includes a plurality of locking legs which protrude forward from the knee protection panel and locking holes formed in the interior member through which the locking legs are passed so as to be locked at edges of the knee protection panel. In this construction, in the event that each locking leg at the edge of the knee protection panel is passed through a locking hole so as to be locked, the rear surface of the knee protection panel can be made flush with the rear surface of the interior member. Due to this, the knee protection panel can create a visually attractive break with the interior member when in the standby position before the knee protection system is activated.

Furthermore, the engagement portion of either the holding portion or the knee protection panel is formed into a tubular shape and is arranged such that into it the end of the other of the engagement portions is inserted with the knee protection panel disposed at the standby position. Furthermore, an opening in the engagement portion which is formed into the tubular shape is formed larger in size than the end of the other engagement portion so that in the state where the engagement portions have not yet been brought into engagement with each other, the knee protection panel can move in the vertical direction or in the horizontal direction, or both, relative to the holding portion. In addition, the one of the engagement portions which is formed into the tubular shape is given internal dimensions so that the distal end of the other engagement portion comes into fitted engagement.

In this construction, one engagement portion is already inserted into the other of the engagement portions when the knee protection panel is in the standby position. Due to this, when the holding portion moves rearward, the distal end of the other engagement portion can move within the tubular engagement portion, whereby the engagement portions can come into a secure engaged state.

Note that the engagement structure type in which the engagement portions are brought into engagement with each other as has been described above may be a snap-fastening type in which a locking pawl or locking leg is locked in a predetermined locking hole or the like. In this snap-fastening type, locking pawls or locking legs may be locked at the edge of the knee protection panel. Furthermore, an engagement type which makes use of a fastener may be used as the engagement type in which the engagement portions are brought into engagement with each other.

In the event that a fastener is used for engagement of the respective engagement portions, the engagement portion at the knee protection panel is preferably configured so as to have a larger area than the engagement portion at the holding portion. In this construction, even in the event that the knee protection panel is displaced greatly vertically or horizontally relative to the holding portion in order to provide a visually attractive break with the interior member, when the knee protection system is activated, the engagement portion at the holding portion which moves rearward can be brought into engagement with the engagement portion at the knee protection panel in a smooth fashion.

Furthermore, in the event that the knee protection system includes alignment means for connecting the knee protection panel to the interior member in such a manner that the rear surface of the knee protection panel becomes flush with the rear surface of the interior member and that the alignment means includes a plurality of locking legs which protrude forward from the knee protection panel and locking holes formed in the interior member through which the locking legs are passed so as to be locked at the surrounding edge, the alignment means may be provided with a rearward movement restriction member for preventing the further rearward movement of the knee protection panel disposed at the protecting position. This rearward movement restriction member is disposed at a front end of each locking leg. Then, the rearward movement restriction member includes a flexible shank portion which extends forward from each locking leg so as to pass through the locking hole and an separation-preventing portion which can be locked at the circumferential edge of the locking hole. When constructed in this way, the drive mechanism includes a driving rod which moves rearward, and the engagement portion of the holding portion is disposed at the rear end of the driving rod. Then, the engagement portion of the knee protection panel is constructed to include a concavity depressed to the rear direction, so that the engagement portion of the holding portion which moves rearward can be fitted thereinto to thereby prevent the knee protection panel from moving to be displaced vertically and horizontally.

In this construction, the rearward movement restriction member restricts the rearward movement of the knee protection panel when the engagement portions are brought into engagement with each other. Due to this, the engagement portion does not have to restrict the rearward movement of the knee protection panel by itself.

Note that as the rearward movement restriction member, the separation-preventing portion may be replaced with a pretensioner which under normal conditions biases the shank portion in such a manner that the shank portion is pulled forward.

It goes without saying that the knee protection panel may be constructed so that the rearward movement thereof is restricted by virtue of the engagement of the engagement portion itself when the engagement portions are brought into engagement with each other. This construction can be formed in the event that the snap-fastening type or the fastener type of engagement is used to bring the engagement portions into engagement with each other. Then, in this construction, the engagement portions at the holding portion and the knee protection panel are brought into engagement with each other while preventing the vertical, horizontal and rearward dislocation of the knee protection panel relative to the holding portion.

In addition, as a member for restricting the rearward movement of the knee protection panel disposed at the protecting position, a rearward movement restriction member made of a cord material, a rod material or a wire material which connects the knee protection panel to the interior member side may be provided separately for use for that purpose without making use of the locking legs of the alignment means. Note that the rearward movement restriction member in this case may be connected on the side toward the interior member not only to the interior member itself, but instead to the drive mechanism or a member of the vehicle body. In the event that this construction is adopted, it goes without saying that the pretensioner, which biases the knee protection panel forward, may be connected at a location toward the interior member side. In addition, in the event that this construction is adopted, the engagement portions disposed at the holding portion and the knee protection panel are brought into engagement with each other while preventing the vertical, horizontal and rearward displacement of the knee protection panel relative to the holding portion.

DESCRIPTION OF THE PREFERRED EMBODIMENTS

Preferred embodiments of the present invention are described below with reference to the accompanying drawings. The invention is not, however, limited to the embodiments disclosed herein. All modifications within the appended claims and equivalents relative thereto are intended to be encompassed in the scope of the claims.

Figure 1:
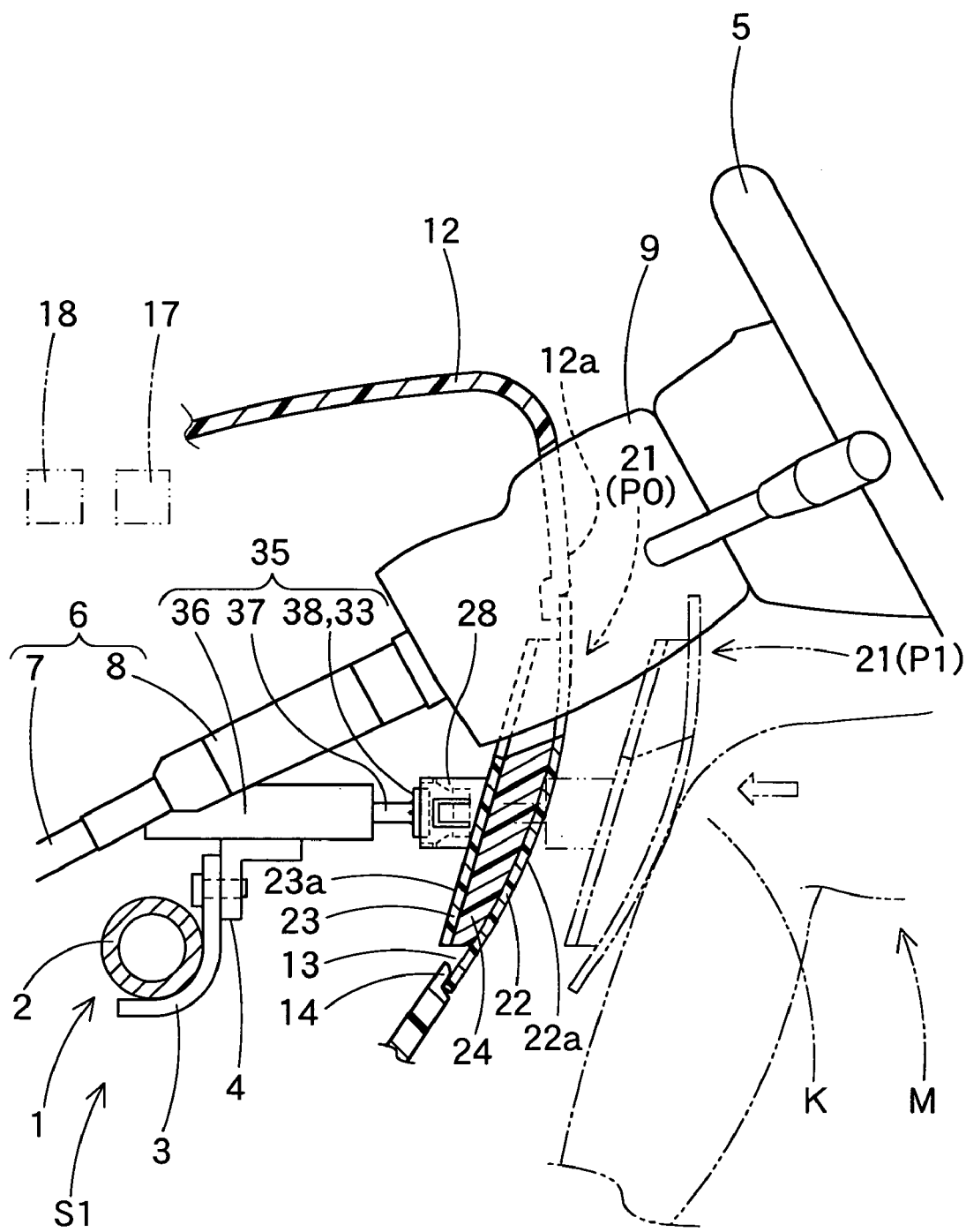
FIG. 1 is a schematic vertical sectional view of a knee protection system according to a first embodiment of the invention.
Figure 2:
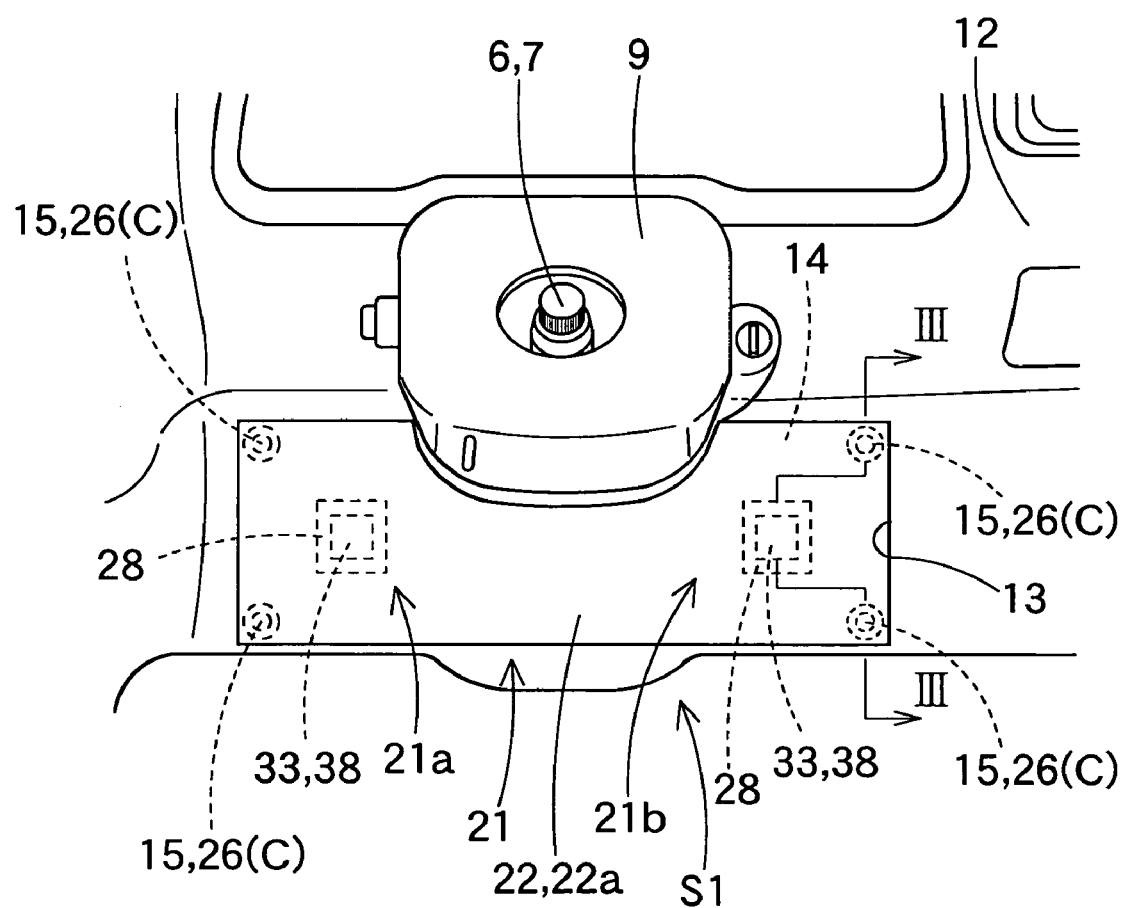
FIG. 2 is a schematic front view of the knee protection system according to the first embodiment shown in FIG. 1, viewed from the vehicle rear side.

As shown in FIGS. 1, 2, a knee protection system S1 according to a first embodiment is disposed below a steering column 6 so as to protect the knees K of an occupant, in this case a driver M.

Note that when used in this specification, positional relationships expressed by words such as vertically, longitudinally, and horizontally or transversely are based on a state in which the knee protection system S1 is installed on a vehicle and correspond to positional relationships expressed in relation to the vehicle such as vertically, longitudinally, and horizontally or transversely in the vehicle on which the knee protection system S1 is installed.

As shown in FIG. 1, the steering column 6 includes a main shaft 7, which is connected to a steering wheel 5, a column tube 8, which covers the periphery of the main shaft 7, and a column cover 9, which covers the peripheries of the main shaft 7 and the column cover 9. The column cover 9 protrudes diagonally upwardly and to the rear from an instrument panel 12.

The knee protection system S1 includes a knee protection panel 21 and a drive mechanism 35 for moving the knee protection panel 21.

The drive mechanism 35 includes an actuator 36 as a drive source for moving a driving rod 37, which is made to protrude rearward, to a rear side. The actuator 36 is made up of a hydraulic cylinder, an electromagnetic solenoid, a motor and the like and its operation is controlled by a control unit 17. This actuator 36 is held rigidly at two locations on a body side member 1 such as an instrument panel reinforcement 2 of a vehicle via brackets 3, 4.

Note that in the knee protection system according to the first embodiment, two actuators 36 and hence the same number of drive mechanisms 35 are used and are then disposed in areas 21a, 21b which are situated on left and right sides of the column cover 9, respectively (refer to FIG. 2).

Then, the driving rod 37 of each actuator 36 has a holding portion 38 that is connected to a rear end thereof for holding the knee protection panel 21 when moved rearward. Each holding portion 38 is disposed, as viewed from the rear side of the vehicle, substantially at a center of each of the areas 21a, 21b which are situated on the left and right sides of the column cover 9 on the front side of the knee protection panel 21 which faces to the front of the vehicle. In addition, each holding portion 38 has an engagement portion 33 disposed thereon for use when holding the knee protection panel 21. In the case of the first embodiment, each engagement portion 33 includes, as shown in FIGS. 3 to 6, a substantially square plate-like base portion 33a adapted to be connected to the distal end (the rear end) of the driving rod 37 and locking portion 33c which is substantially a rectangular tube which extends from an outer circumferential edge of the base portion 33a toward the front side of the vehicle.

As shown in FIGS. 1 to 4, the knee protection panel 21 includes a designed surface portion 22 which is exposed to the occupant M side, a front surface portion 23 which is situated on the holding portion 38 side and an impact absorbing portion 24 which is interposed between the designed surface portion 22 and the front surface portion 23. The designed surface portion 22 is disposed in an opening 13 in the instrument panel 12 portion of the vehicle interior, comprising a substantially rectangular plate formed from a synthetic resin such as a polypropylene or ABS resin. Note that the opening 13 is formed substantially into a rectangular shape, faces the longitudinal direction of the vehicle and is disposed in an area which extends transversely below the column cover 9.

Locking legs 26 are provided on a front side of the designed surface portion 22 at the four corners of its outer circumferential edge, so as to protrude to the front side. Each locking leg 26 is passed through a locking hole 15 formed in the inner circumferential edge portion 14 of the opening 13 in the instrument panel 12 so as to be locked at the circumferential edge portion 14. Then, the knee protection panel 21 is disposed at a standby position P0 where it is located before the knee protection system S1 is activated, with the locking legs 26 locked at the circumferential edge portion 14, whereby the knee protection panel 21 is disposed in such a manner that the rear surface 22a which faces the rear of the vehicle is flush with the rear surface 12a of the instrument panel 12 which faces the rear of the vehicle, thus securing a visually attractive break with the instrument panel 12. Namely, in the first embodiment, the locking holes 15 and the locking legs 26 constitute a alignment means C, and this alignment means C connects the knee protection panel 21 to the interior member 12 while providing a visually attractive break therebetween.

The impact absorbing portion 24 is provided in the areas 21a, 21b which are situated on the left and right side of the column cover 9 on the front side of the designed surface portion 22 of the knee protection panel 21 and is also provided on the front side of the same surface portion which is situated below the column cover 9. The impact absorbing portion 24 is made from a thermoplastic elastomer such as olefin, a synthetic resin such as polypropylene or a metal such as sheet metal. Then, the impact absorbing portion 24 plastically deforms in such a manner that a longitudinal thickness of the impact absorbing portion 24 or a distance thereof between the designed surface portion 22 and the front surface portion 23 is contracted or reduced. When deforming plastically, the impact absorbing portion 24 absorbs the kinetic energy of the knees K which move forward.

The front surface portion 23 is formed from a synthetic resin such as a polypropylene or ABS resin and covers the front side of the impact absorbing portion 24 so as to support the impact absorbing portion 24. The front surface portion 23 is formed into a plate-like shape and the whole circumference of an outer circumferential edge thereof is made smaller than or is caused to recede from the designed surface portion 24.

Note that in the event that the knee protection panel 21 is made from a synthetic resin, the knee protection panel 21 is formed by forming separately the designed surface portion 22, the impact absorbing portion 24 and the front surface portion 23 and connecting them together by virtue of adhesion or welding which makes use of vibration or heat, or else the knee protection panel 21 is formed by molding the impact absorbing portion 24 and the designed surface portion 22 as an integral unit and connecting the front surface portion 23 to this molded article. Furthermore, in the event that the knee protection panel 21 is formed from a synthetic resin, the knee protection panel 21 may be formed by molding the impact absorbing portion 24 and the front surface portion 23 as an integral part and connecting the designed surface portion 22 to the molded article.

Then, as shown in FIGS. 3 to 6, an engagement portion 28 is provided on a front surface 23a of the front surface portion 23 in such a manner as to be situated rearward of each holding portion 38. When the holding portion 38 moves rearward, the engagement portion 28 is brought into engagement with the engagement portion 33 so that the knee protection panel 21 is held by the respective holding portions 38. Each engagement portion 28 includes a tubular portion 29 and a bottom portion 30. The tubular portion 29 is formed into a rectangular tube and includes an opening 29a into which the locking tubular portion 33c of the engagement portion 33 can be inserted from the front side. The bottom portion 30 is situated on the front surface 23a side of the front surface portion 23 which constitutes the rear end of the tubular portion 29, and contacts the whole rear surface 33b of the base portion 33a of the engagement portion 33. Note that in the case of this embodiment, the front surface portion 23 is the bottom portion 30.

Furthermore, the tubular portion 29 includes wall portions 29b, 29c which face each other in the vertical direction and wall portions 29d, 29e which face each other in the transverse direction and is thereby formed substantially into a rectangular tube having its axis parallel to a direction in which the holding portion 38 moves when the knee protection system S1 is activated. A locking pawl 31 is formed on each of the wall portions 29b, 29c, 29d, 29e. Each locking pawl 31 is formed by cutting away the wall so that there remains a portion of rectangular U-shape whose edge removed from the wall freely moves. Two locking pawls 31 are provided on each of the wall portions 29b, 29c which face each other in the vertical direction, whereas one locking pawl 31 is provided on each of the wall portions 29d, 29e which face each other transversely.

Each locking pawl 31 includes a shank portion 31a and a locking hook portion 31c which protrudes to the inner central side of the tubular portion 29 at the leading end of the shank portion 31a. The rear surface 31d of the locking hook portion 31c is made to be the locking surface which is locked on a front surface 33d of the locking tubular portion 33c of the engagement portion 33. In addition, the front surface of the locking hook portion 31c is formed into a slope 31e which extends towards the axial center of the tubular portion 29 as it extends to the rear. Thus formed, the slope 31e constitutes a guide portion 32; in other words, a guide surface which aligns the center O1 of the locking tubular portion 33c of the engagement portion 33 and a center O2 of the tubular portion 29 of the engagement portion 28. Note that the engagement portion 33 is provided on the drive mechanism 35 which is fixed to the body side member 1, and when the drive mechanism 35 is activated, the outer circumferential edge of the base portion 33a of the engagement portion 33 or the outer surface of the tubular portion 33c locked with the base portion 33a near the base portion 33a slides on the guide surface 31e, whereby the center O2 of the engagement portion 28 is shifted toward the center O1 of the engagement portion 33 so that the two are aligned.

Figure 3:
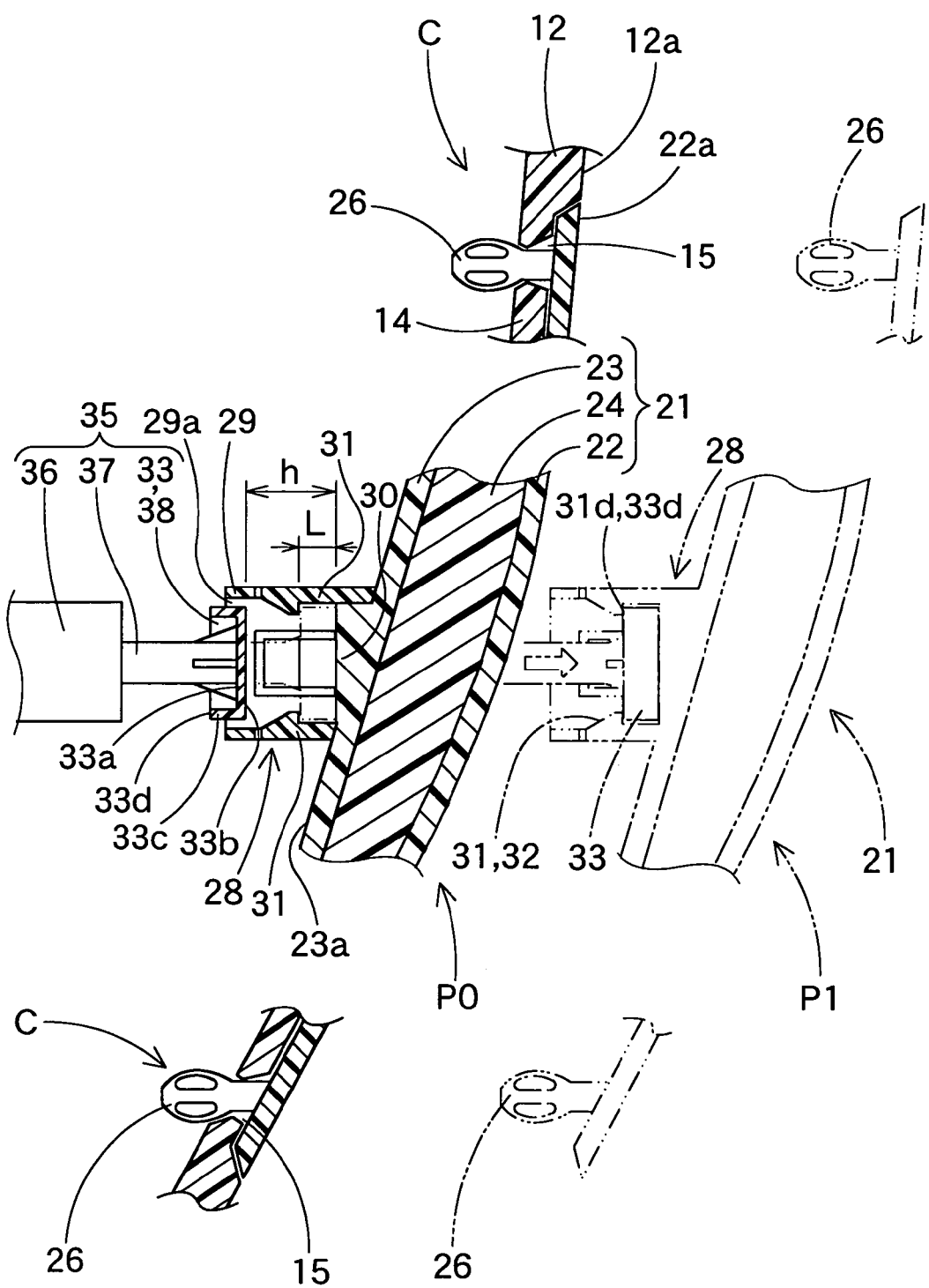
FIG. 3 is a partially enlarged vertical sectional view of the knee protection system according to the first embodiment shown in FIG. 1, which corresponds to the section taken along the line III-III in FIG. 2.
Figure 4:
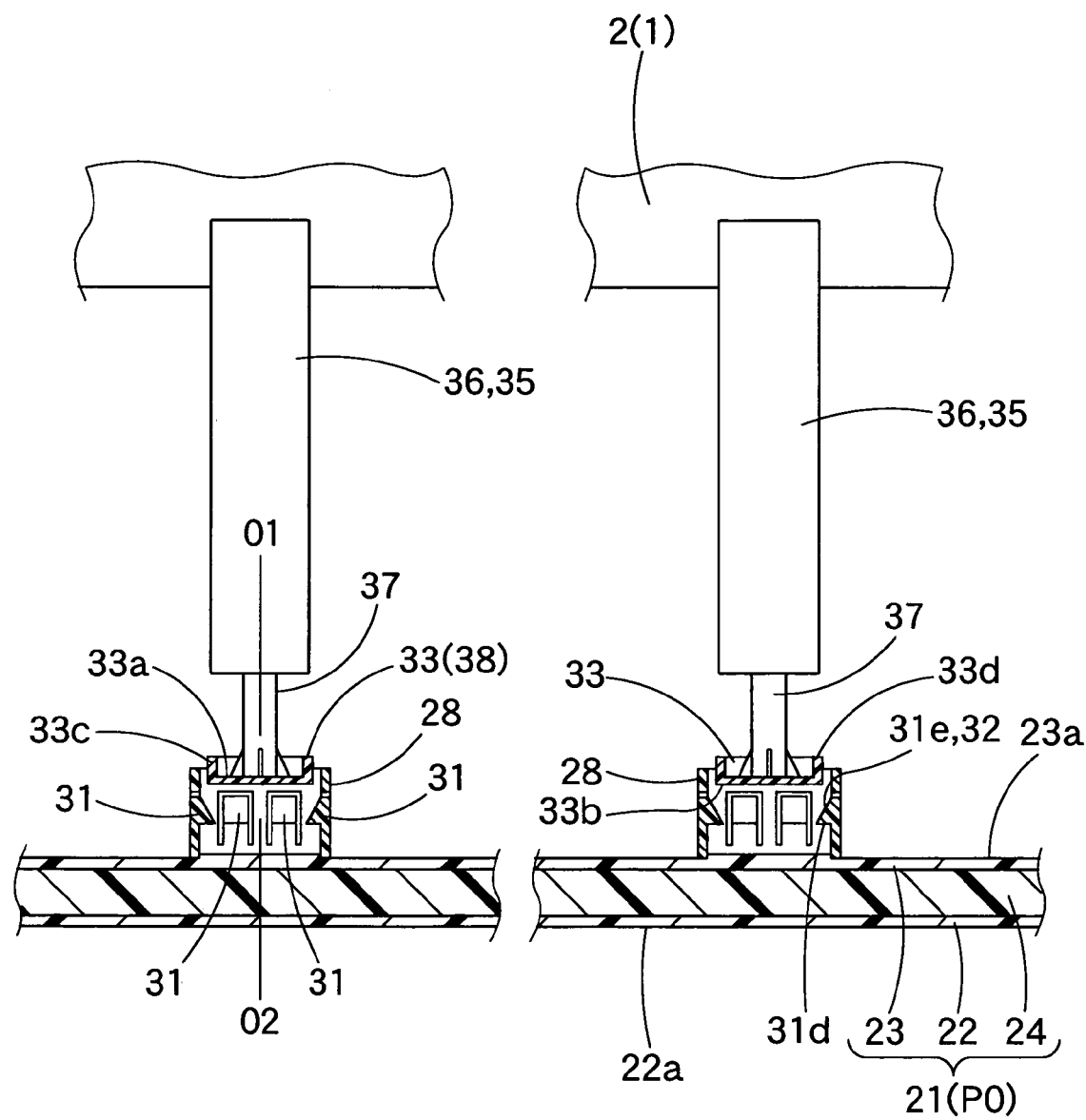
FIG. 4 is a schematic horizontal sectional view of the knee protection system according to the first embodiment shown in FIG. 1, which shows the vicinity of an engagement portion.
Figure 5:
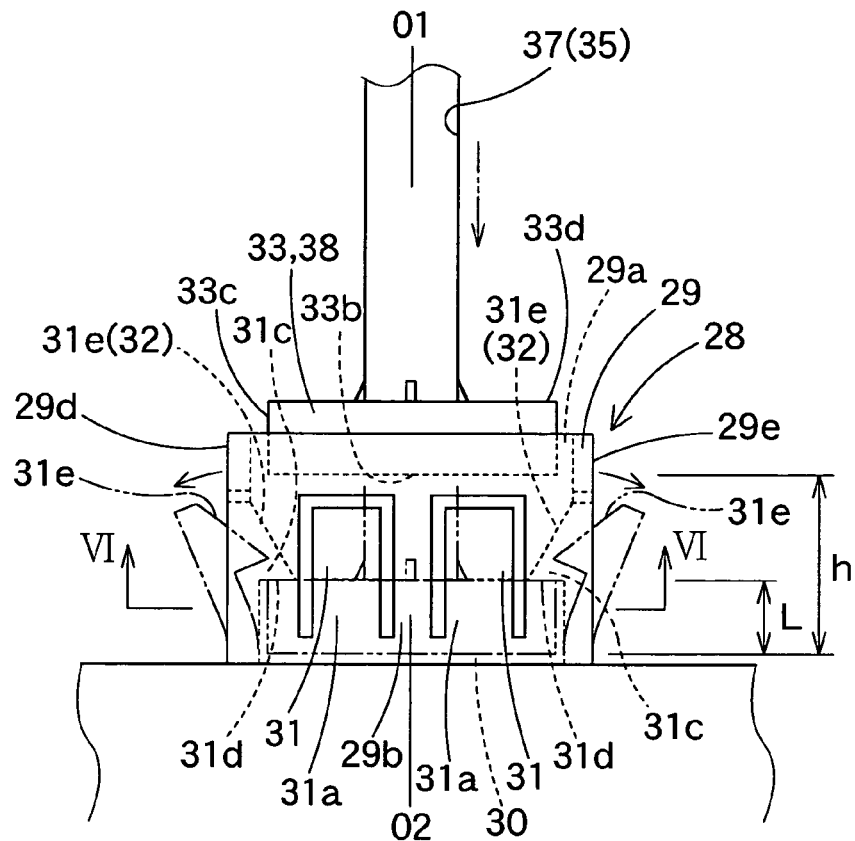
FIG. 5 is an enlarged plan view showing respective engagement portions of the first embodiment shown in FIG. 1.
Figure 6:
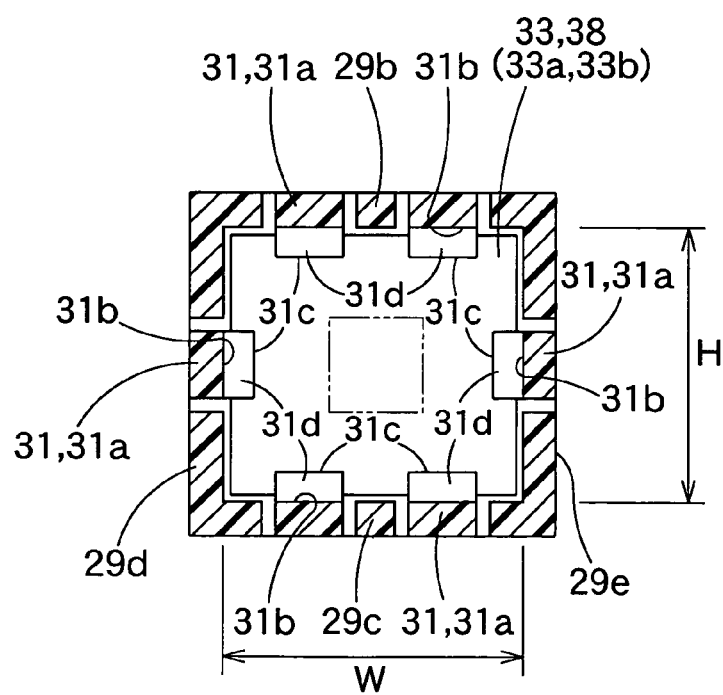
FIG. 6 is a schematic vertical sectional view taken along the line VI-VI in FIG. 5.

Furthermore, as shown in FIGS. 3, 5, 6, vertical and horizontal dimensions H, W of each engagement portion 28 which are defined by internal surfaces 31b of the shank portions 31a of the respective locking pawls 31 are substantially equal to vertical and horizontal outside dimensions of each engagement portion 33, and a distance L from the bottom portion to the engagement surface 31d is substantially equal to a longitudinal thickness (a lengthwise dimension of the locking tubular portion 33c) of each engagement portion 33. Due to this, the engagement portion 28 can accommodate therein the engagement portion 33 in such a manner that the engagement portion 33 fits inside the space defined by the internal surfaces 31b of the engagement portion 28.

On the other hand, the opening 29a in the tubular portion 29 of the engagement portion 28 is formed larger than the engagement portion 33. Then, in the case of the first embodiment, the area of the opening 29a is set such that compensation can be made for an assembling error of the knee protection panel 21 relative to the body side member 1 or an assembling error of the knee protection panel 21 relative to the drive mechanism 35 fixed to the body side member 1 when the knee protection panel 21 is disposed at the standby position P0 by passing the locking leg portions 26 of the alignment means C through the locking holes 15 thereof so as to be locked. In the case of the first embodiment, the inside dimensions of the tubular portion 29 of the engagement portion 28 on the knee protection panel 21 is set larger by on the order of 3 to 10 mm than the outside dimensions of the locking tubular portion 33c of the engagement portion 33 on the holding portion 38, not only vertically but also horizontally.

In addition, in the case of the first embodiment, the rear end of each engagement portion 33 is set so as to slightly enter the interior of the tubular portion 29 from the front side, so that a gap h between the rear surface 33b of the base portion 33a of the engagement portion 33 and the bottom portion 30 of the engagement portion 28 is set to range from on the order of 5 to 30 mm in a state in which the knee protection panel 21 is disposed at the standby position.

The control unit 17 is electrically connected to a plurality of sensors 18 which are disposed on a bumper or the like. The sensors 18 are such as to detect an object which approaches the front of the vehicle from ahead thereof, and a type of sensor which adopts infrared or ultrasonic wave or a type of sensor which adopts a CCD camera can be taken for example. The control unit 17 receives signals inputted from the respective sensors 18 in consideration of a then vehicle speed and activates the actuators 36 of the respective drive mechanisms 35 when detecting a collision which will become true.

In the installation of the knee protection system S1 according to the first embodiment on the vehicle, firstly, while connecting a signal wire from the control unit 17 that has already been installed on the vehicle thereto, the drive mechanisms 35 are mounted and fixed to the vehicle body side member 1 by making use of the brackets 3, 4, and then, the knee protection panel 21 is installed on the vehicle. The installation of the knee protection panel 21 is implemented when the respective locking legs 26 are passed through the locking holes 15 formed in the instrument panel 12 that has already been mounted, so as to be locked therein, and the rear end portions of the engagement portions 33 on the drive mechanisms 35 are inserted into the tubular portions 29 of the respective engagement portions 28.

Figure 7A:
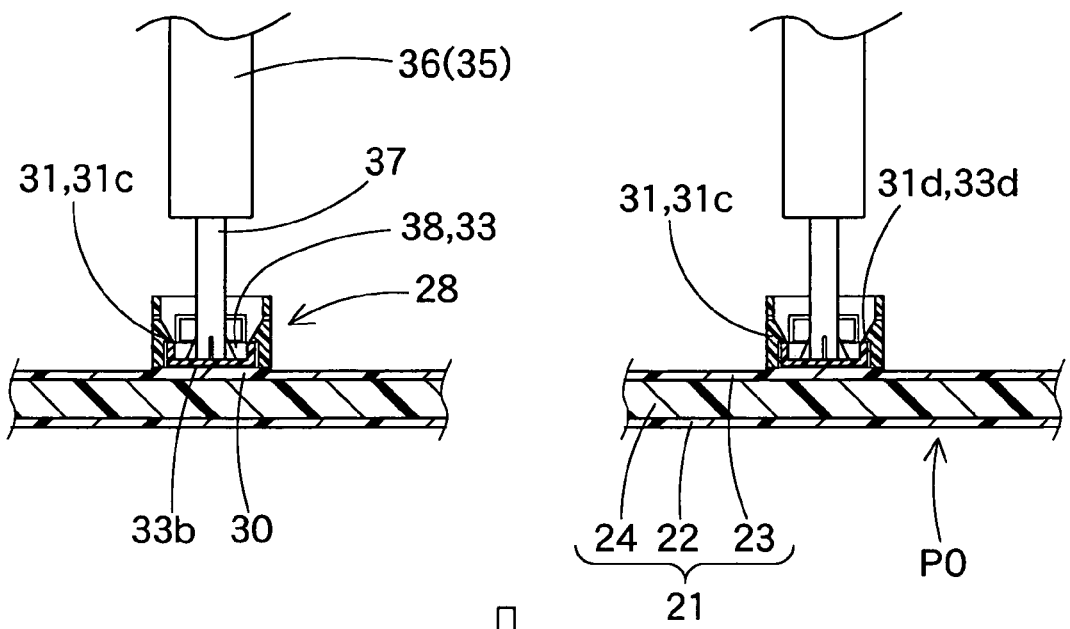
FIGS. 7A, 7B show sequentially the operation of the knee protection system according to the first embodiment shown in FIG. 1.
Figure 7B:
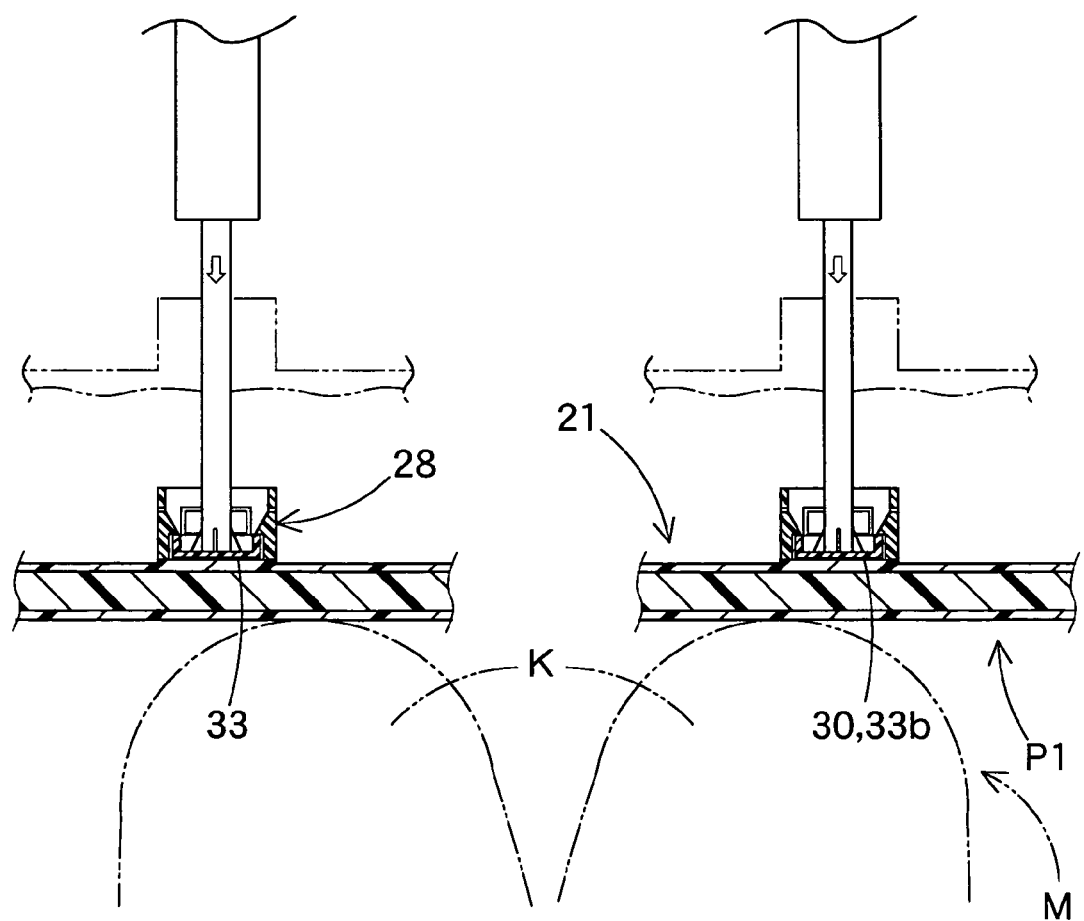

Then, when the vehicle is running with the knee protection system S1 being equipped thereon, in the event that the control unit 17 detects the occurrence of a collision from signals from the sensors 18, the actuators 36 of the respective drive mechanisms 35 are activated by the control unit 17, and the holding portions 38 connected to the rear ends of the respective driving rods 37 are moved toward the rear of the vehicle by the rearward movement of the respective driving rods 37. Then, as shown in FIGS. 7A, 7B, the engagement portions 33 of the respective holding portions 38 move rearward within the tubular portions 29 of the engagement portions 28 while deflecting the locking hook portions 31c of the respective locking pawls 31 to thereby be fitted between the locking surfaces 31d of the locking hook portions 31c and the bottom portions 30. Then, the locking surfaces 33d of the locking tubular portions 33c are locked on the locking surfaces 31d, whereby the engagement portions 28, 33 are brought into abutment with each other. Then, with the engagement portions 28 being held by the holding portions 38, the knee protection panel 21 is disposed at a protecting position P1 which constitutes a knee protection panel 21 deployed position in front of the knees K of the occupant M.

As a result, as indicated by double-dashed lines in FIGS. 1 and 7B, the knees K, which move forward, are stopped by the knee protection panel 21, so that the impact absorbing portion 24 of the knee protection panel 21 held by the holding portions 38 is elastically deformed. Then, the knees K moving forward are restrained by the knee protection panel 21 in a state in which the kinetic energy of the knees is absorbed, whereby the knees K are protected effectively.

Note that when the engagement portions 33, 28 are brought into engagement with each other, the front surfaces 33d of the locking tubular portions 33c are restricted by the rear surfaces 31d of the locking hook portions 31c, and the rear surfaces 33b of the base portions 33a are restricted by the bottom portions 30. Due to this, the knee protection panel 21 is held by the holding portions 38 with no longitudinal movement permitted. In addition, since the outer circumferential surfaces of the locking tubular portions 33c are restricted by the internal surfaces of the shank portions 31a of the respective locking pawls 31, the knee protection panel 21 is held by the holding portions 38 without vertical and/or horizontal displacement.

Then, in the knee protection system S1 according to the first embodiment, since the engagement portions 33, 28 of the holding portions 38 on the drive mechanisms 35 and the knee protection panel 21 are not in engagement with each other before the drive mechanisms 35 are activated, the knee protection panel 21 is permitted to be displaced vertically and horizontally, whereby the knee protection panel 21 can be arranged so as be permitted be displaced relative to the drive mechanisms 35 which are fixed to the vehicle body side member 1 so that a visually attractive break can be provided between the knee protection panel 21 and the interior member 12. Then, the mounting work efficiency of the drive mechanisms 35 and the knee protection panel 21 on the vehicle can be improved.

Then, when the knee protection system S1 is activated, since the engagement portions 33, 28 of the holding portions 38 on the drive mechanisms 35 and the knee protection panel 21 are brought into engagement with each other, the holding portions 38 prevents the displacement of the knee protection panel 21 to thereby hold the knee protection panel 21 properly and permits the rearward movement of the knee protection panel 21 to the protecting position P1 where the knee protection panel 21 can protect the knees K properly.

Consequently, in the knee protection system S1 according to the first embodiment, the knee protection panel 21 can be arranged at the standby position P0 without deteriorating the mounting work efficiency while providing a visually attractive break relative to the interior member 12.

In addition, in the first embodiment, the guide portion 32 is provided, and this guide portion 32 allows the engagement portions 33, 28 which are provided at the connecting locations of the holding portions 38 and the knee protection panel 21 to engage with each other at the positions of the centers O1, O2 thereof when the engagement portions are brought into engagement with each other. Due to this, the knee protection panel 21 is permitted to be displaced relative to the drive mechanisms 35 so as to provide a visually attractive break with the interior member 12 when disposed at the standby position P0 before the drive mechanisms 35 are activated, and even in the event that the centers O1, O2 of the engagement portions 33, 28 are displaced from each other, when the system is activated, the guide surfaces 31e, which function as the guide portion 32, permit the vicinity of the outer circumferential edges of the base portions 33a of the engagement portions 33 and the outer surfaces of the tubular portions 33c locked to the base portions 33a to slide on to be guided such that the centers O1, O2 of the engagement portions 33, 28 coincide with each other. As a result, the knee protection panel 21 is permitted to be held by the holding portions 38 in a proper position, whereby, even in the event that the knee protection panel 21 stops the motion of the knees K, the knee protection panel 21 can maintain that position, thereby making it possible to protect the knees K properly.

Furthermore, in the first embodiment, when the knee protection panel 21 is in the standby position P0, the distal ends (the front ends) of the engagement portions 28 having the tubular portions 29 and the distal ends (the rear ends) of the engagement portions 33 are superposed, and parts (the rear ends) of the engagement portions 33 are inserted in advance in the tubular portions 29 of the engagement portions 28, whereby when the engagement portions 33 move rearward, the knee protection system S1 can reliably engage into the state in which the engagement portions 33 are locked by the locking pawls 31 of the engagement portions 28, and the engagement completed state can be secured stably in which the engagement portions are securely in engagement with each other.

Note that in the knee protection system S1 according to the first embodiment, the engagement construction is illustrated in which the locking pawls 31 lock on the locking tubular portions 33c in such a manner that the engagement portions 33, 28 are brought into engagement with each other by snap-fastening. However, the locking members such as the locking pawls and the locking legs which realize the snap-fastening need not be provided on the knee protection panel 21 side but alternately may be provided on the holding portion 38 side. Then, the locking location where the locking members effect locking may be constituted not only by the circumferential edges of the tubular portions or the locking holes but also an edge provided on the knee protection panel 21 in which there is formed no hole. Furthermore, the engagement construction in which the engagement portions are brought into engagement with each other may not be the construction in which the engagement portions are snap-fastened to each other. For example, the engagement construction may be such as to make use of a fastener as embodied in engagement portions 41, 45 of a knee protection system S2 according to a second embodiment of the invention shown in FIGS. 8, 9, and the holding portions 38 of the drive mechanisms 35 may hold the knee protection panel 21 using a fastener.

The engagement portions 41, 45 are made up of flat plate-like base portions 42, 46 and a number of locking legs 43, 47 which are provided on the base portions 42, 46 at predetermined intervals in such a manner as to protrude therefrom. The locking legs 43, 47 are made up, respectively, of shank portions 43a, 47a extending from the base portions 42, 46, respectively, and locking head portions 43b, 47b which are expanded diametrically at distal ends of the shank portions 43a, 47a. Then, the engagement portion 41 is fixed to a substantially rectangular plate-like holding portion 38 secured to a rear end of a driving rod 37 of a drive mechanism 35 and the engagement portion 45 is fixed to a front surface 23a of a front surface portion 23 of a knee protection panel 21, with the sides of the engagement portions 41, 45 on which the locking head portions 43b, 47b are provided being made to approach each other.

Note that in the case of the second embodiment, as with the first embodiment, the knee protection panel 21 includes locking legs 26 (not shown) which are passed through locking holes 15 of an alignment means C so as to be locked therein, as well as a designed surface portion 22, a front surface portion 23 and an impact absorbing portion 24. Furthermore, a mounting portion 23b on which a substantially vertical surface is provided is arranged on a front surface 23a side of the front surface portion 23, and the base portion 46 of the engagement portion 45 is fixed to the mounting portion 23b. In addition, the drive mechanism 35 of the second embodiment is also fixed to a vehicle body side member 1 by making use of brackets 3, 4 and includes an actuator 36 that is controlled by a control unit 17 and the driving rod 37. The driving rod 37 has the substantially rectangular plate-like holding portion 38 provided at the rear end thereof and is moved rearward by the actuator 36. The actuator 36 is arranged at two locations on left and right sides of a column cover 9. Then, in the second embodiment, only the engagement portion 41, the shape of the holding portion 38 to which the engagement portion 41 is fixed, the engagement portion 45, the shape of the front surface portion 23 (the mounting portion 23b) to which the engagement portion 45 is fixed and the shape of the impact absorbing portion 24 differ from those of the first embodiment, and the other structural features of the second embodiment are similar to those of the first embodiment, and hence like reference numerals are given to like constituent locations to those of the first embodiment, the description thereof being omitted.

Figure 9A:
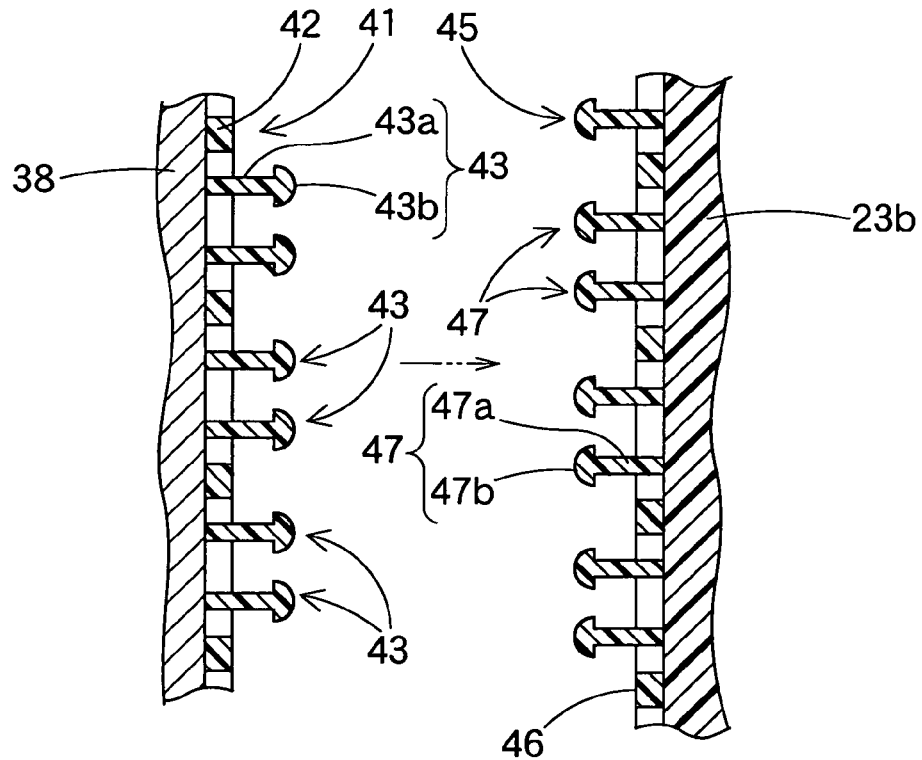
FIGS. 9A, 9B are enlarged sectional views showing sequentially an engagement of respective engagement portions according to the second embodiment shown in FIG. 8.
Figure 9B:
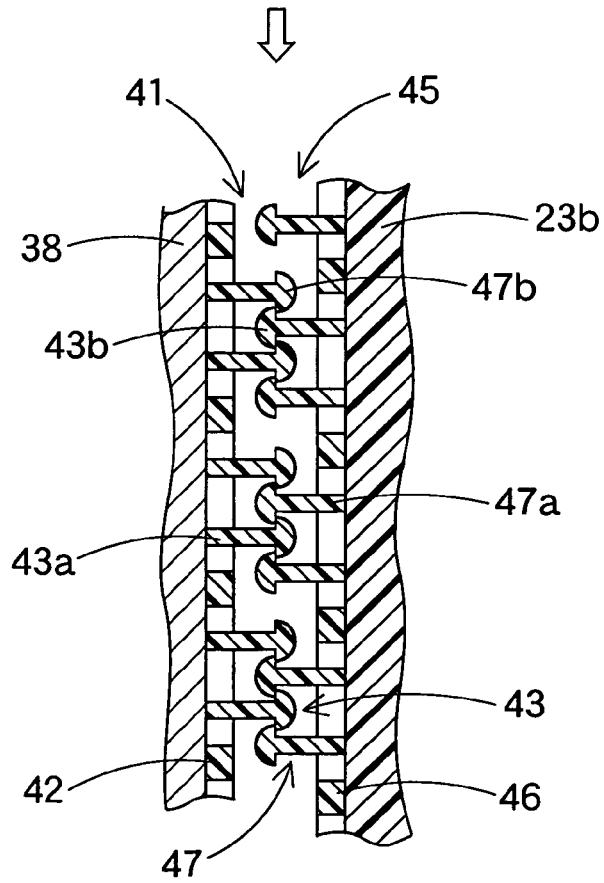

Then, as shown in FIGS. 9A, 9B, when the engagement portions 41, 45 are made to approach each other so that the number of locking legs 43, 47 come to abutment with each other so that the locking head portions 43b, 47b overlap, the respective rear surfaces of the locking head portions 43b, 47b (sides of the locking head portions 43b, 47b which face the shank portions 43a, 47b) are brought into engagement with each other, and the engagement portions 41, 45 are engaged. As a result, the knee protection panel 21 is held without vertical, horizontal or longitudinal displacement relative to the holding portions 38.

Figure 8:
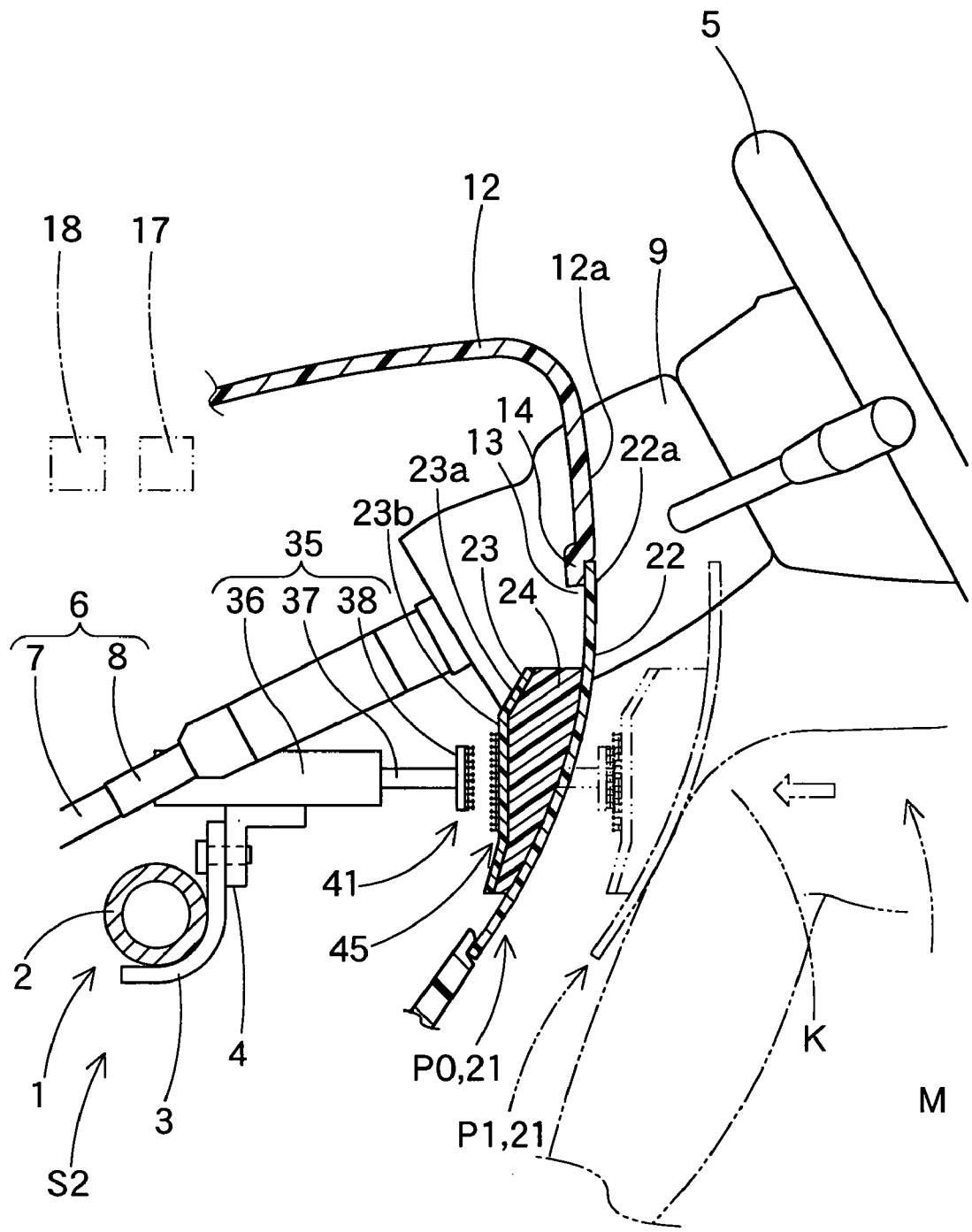
FIG. 8 is a schematic vertical sectional view of a knee protection system according to a second embodiment.

Namely, in the second embodiment, when the drive mechanisms 35 are activated, the driving rods 37 are moved rearward, and the engagement portions 41, 45 of the holding portions 38 on the drive mechanisms 35 and the knee protection panel 21 are brought into engagement with each other, whereby, as indicated by double-dashed lines in FIG. 8, the holding portions 38 hold the knee protection panel 21 while preventing dislocation between them. Furthermore, the holding portions 38 move the knee protection panel 21 to a protecting position P1 where the knees K can be protected. Then, the knees K moving forward come to interfere with the knee protection panel 21, whereby the impact absorbing portion 24 of the knee protection panel 21 which is held by the holding portions 38 is plastically deformed. Due to this, the knees K are restrained by the knee protection panel 21 with the kinetic energy thereof being reduced, thereby making it possible to protect the knees K effectively.

Of course, also in the second embodiment, in a state before the drive mechanisms 35 are activated or in the event that the knee protection panel 21 is disposed at the standby position P0, as indicated by solid lines in FIG. 8, the engagement portions 41, 45 are separated apart from each other in the longitudinal direction and are in a disengaged state. Due to this, the knee protection panel 21 is permitted to be displaced vertically and horizontally relative to the holding portions 38, whereby the knee protection panel 21 can be disposed in an opening 13 in an instrument panel 12 with a visually attractive break between the knee protection panel 21 and the interior member 12.

Consequently, also in the knee protection system S2 according to the second embodiment, the knee protection panel 21 can be disposed at the standby position P0 while providing a visually attractive break with the interior member 12 without deteriorating the mounting work efficiency.

Note that in the second embodiment, the engagement portion 45 is arranged in such a manner as to have a wider area than the engagement portion 41 on the holding portion 38 side. Due to this, even in the event that the knee protection panel 21 is greatly displaced relative to the holding portions 38 with a view to providing a visually attractive break with the interior member 12, the engagement portion 41, which is moved rearward when the knee protection system S2 is activated, is permitted to engage with the engagement portion 45 in a smooth fashion.

In addition, in the second embodiment, while the engagement portions 41, 45 are described as being provided with the locking legs 43, 47 having similar shape, in the event that a fastener is used at the engagement portion, the fastener so used may be shaped into any shape, provided that the holding portions are permitted to hold the knee protection panel without vertical, horizontal and longitudinal displacement. Due to this, for example, engagement portions may be used in which a number of loops are provided on one of the engagement portions, and a number of hooks which can lock the corresponding loops are provided on the other engagement portion.

Furthermore, in the engagement portions 28, 33, 41, 45 according to the first and second embodiments, the engagement portions are described as preventing not only the vertical and horizontal displacements of the knee protection panel 21 but also the longitudinal displacement thereof, that is, the rearward displacement of the knee protection panel 21 away from the holding portions 38 after the engagement portions are brought into engagement with each other. For the prevention of the rearward displacement of the knee protection panel 21, a construction that will be described in a third embodiment shown in FIGS. 10 to 12 may be adopted.

In a knee protection system S3 according to a third embodiment of the invention, a holding portion 38 disposed at a rear end of a driving rod 37 of an actuator 36 of a drive mechanism 35 is provided with a quadrangular dish-like engagement portion 51 which is narrowed as it extends to the rear, and an engagement portion 55, which is provided with a concave portion 55a in which the engagement portion 51 fits, is arranged on a front surface 23 of a front surface portion 23 of a knee protection panel 21A. Note that in the third embodiment, the actuator 36 is arranged at two locations on left and right sides of a column cover 9 and are fixed to a vehicle body member 1 by making use of brackets 3, 4.

The engagement portion 51 is made up of a substantially square plate-like base portion 52 which is fixed to the rear end of the driving rod 37 and a quadrangular tubular side portion 53. The side portion 53 is formed into a quadrangular tubular shape which expands diametrically in a tapered fashion in such a manner as to so expand as it extends forward from the outer edge of the base portion 52.

The knee protection panel 21A includes locking leg portions 26 which are passed through locking holes 15 of an alignment means C, as well as a designed surface portion 22, a front surface portion 23 and an impact absorbing portion 24. Each engagement portion provided on the front surface 23a of the front surface portion 23 is provided with the concave portion 55a which is made concave rearward so that the engagement portion 51 fits therein.

Then, in the knee protection panel 21A of the third embodiment, a rearward movement restriction member 57 is connected to a front end of each locking leg 26. The restriction member 57 prevents the rearward movement of the knee protection panel 21A when the same panel is disposed at a protecting position P1. This rearward movement restriction member 57 includes a shank portion 58 and a separation-preventing portion 59. The shank portion 58 has flexibility and extends from a front end of the locking leg 26 so as to pass through the locking hole 15. The separation-preventing portion 59 is disposed at the front end of the shank portion 58 in such a manner that it can be brought into abutment with the front side of the periphery of the locking hole 15 in a edge portion 14 of an instrument panel or interior member 12.

Figure 12:
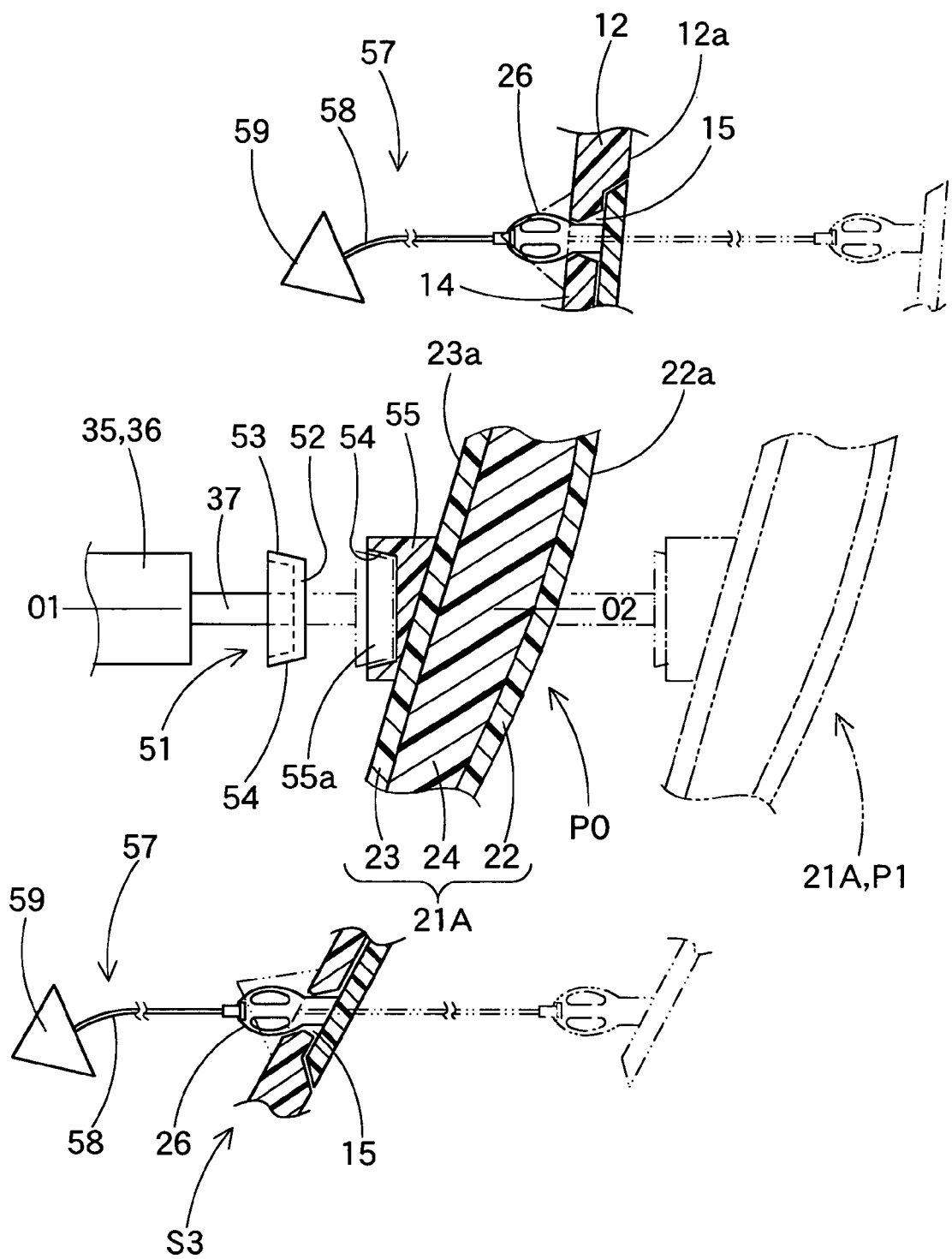
FIG. 12 is a partially enlarged vertical sectional view of the knee protection system according to the third embodiment shown in FIG. 10, which corresponds to the section along the line XII-XII in FIG. 11.

In the knee protection system S3 of the third embodiment, when the drive mechanisms 35 are activated, the driving rods 37 of the actuators 36 are moved rearward, and as indicated by double-dash lines in FIG. 12, the engagement portions 51 of the holding portions 38 on the drive mechanisms 35 are fitted in the concave portions 55a in the engagement portions 55 arranged on the front surface side of the knee protection panel 21A, whereby the knee protection panel 21A is moved rearward while vertical and/or horizontal displacement thereof relative to the holding portions 38 is prevented. Then, when the knee protection panel 21A is moved backward to be disposed at the protecting position P1 where the knees K can be protected, the separation-preventing portions 59 of the rearward movement restriction members 57 are brought into abutment with the circumferential edges of the locking holes 15 formed in the circumferential edge portion 14 on the front surface side of the interior member 12. As a result, the rearward movement of the knee protection panel 21A is restricted. Of course, the forward movement of the knee protection panel 21A is also restricted since the knee protection panel 21A is held by the front side holding portions 38 with the engagement portions 51 being in abutment with front surfaces of the engagement portions 55. Due to this, the knees K moving forward are stopped by the knee protection panel 21A which is prevented from moving not only vertically and horizontally but also longitudinally, whereby the impact absorbing portion 24 is plastically deformed. As a result, the knees K are restrained by the knee protection panel 21A with the kinetic energy thereof being reduced, whereby the knees K are protected effectively.

Figure 10:
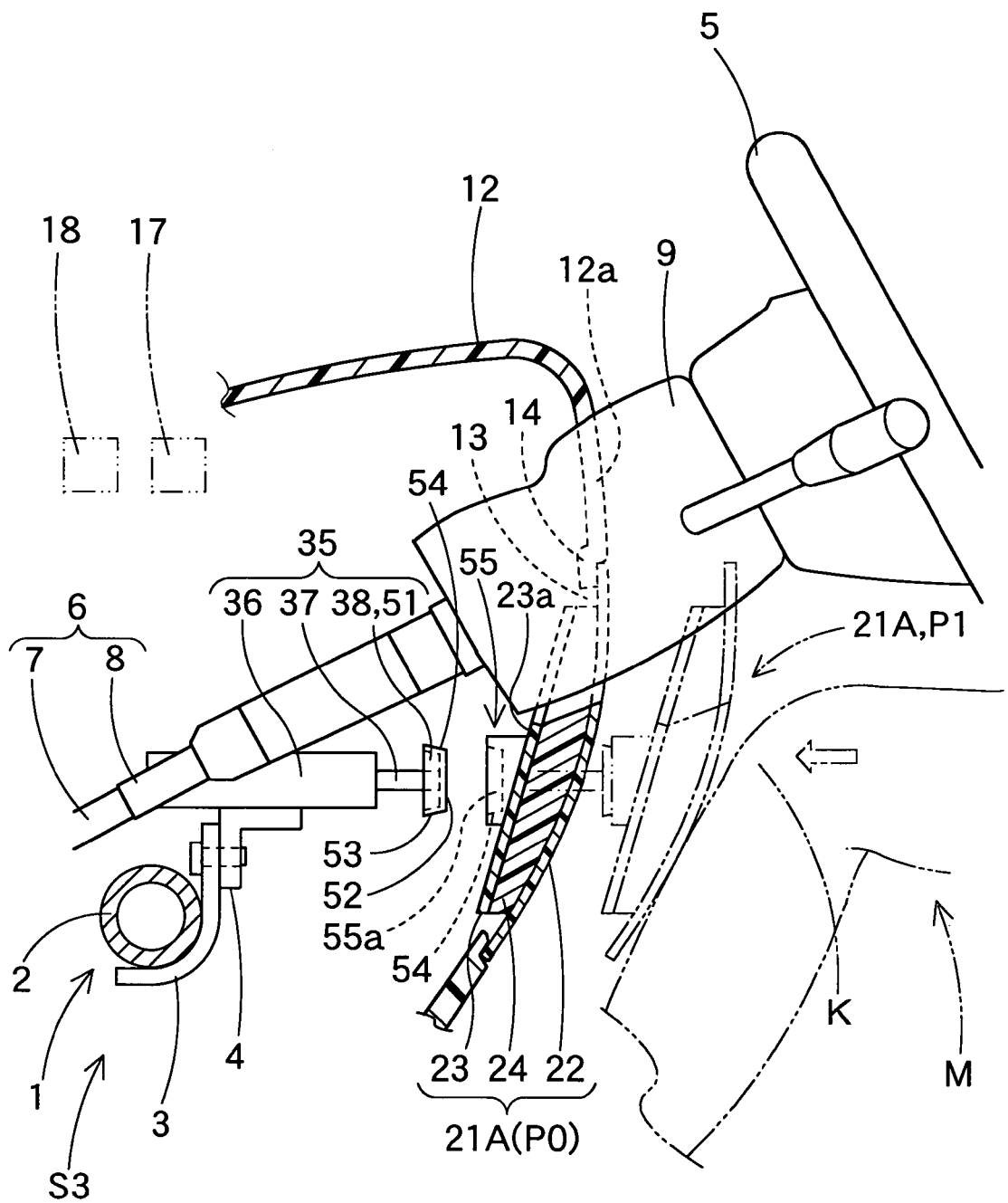
FIG. 10 is a schematic vertical sectional view of a knee protection system according to a third embodiment.
Figure 11:
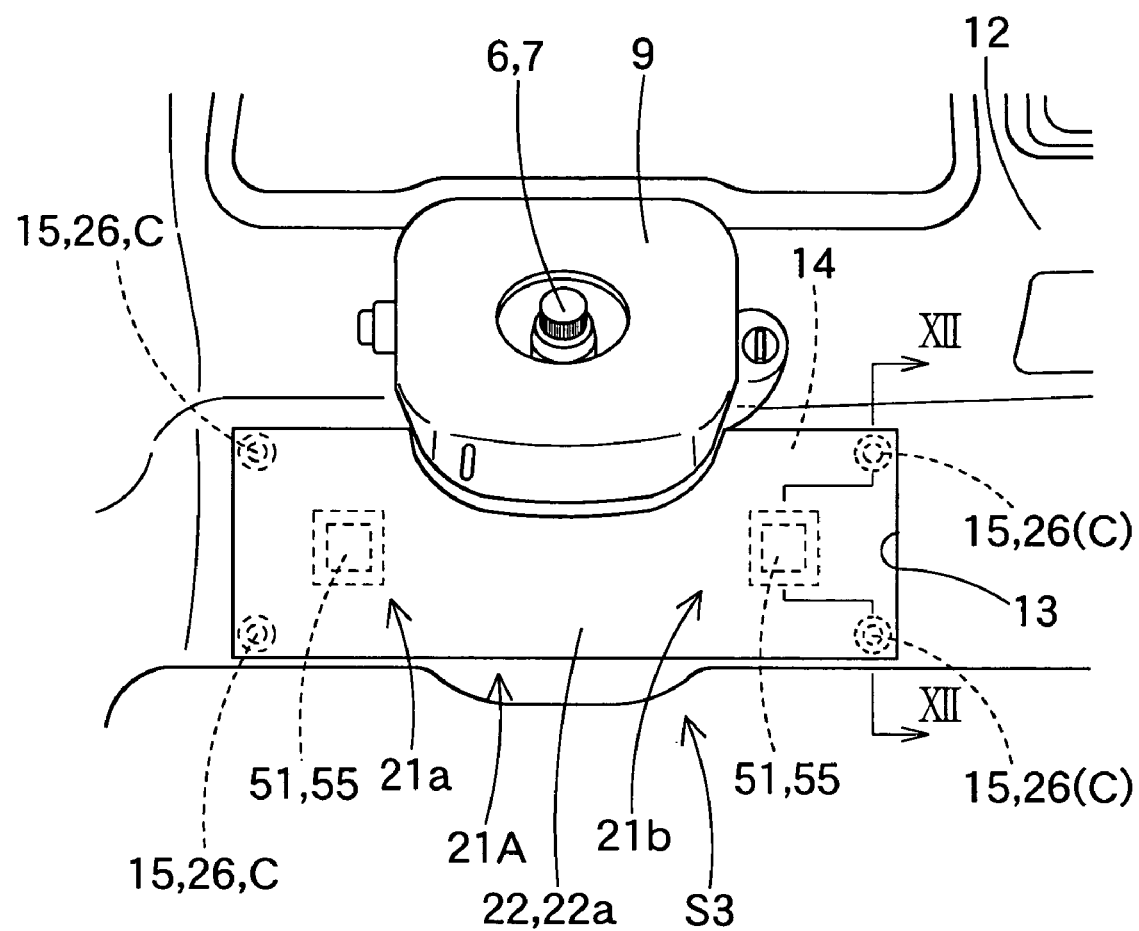
FIG. 11 is a schematic front view of the knee protection system according to the third embodiment shown in FIG. 10, viewed from the vehicle rear side.

Of course, also in the third embodiment, in a state in which the drive mechanisms 35 have not yet been activated, or, in the event that the knee protection panel 21A is disposed at the standby position P0, as indicated by solid lines in FIGS. 10, 12, the engagement portions 51, 55 are separated apart from each other in the longitudinal direction and are in a disengaged state. Due to this, the knee protection panel 21A can be displaced freely in vertical and horizontal directions relative to the holding portions 38, whereby the knee protection panel 21A can be arranged in an opening 13 in the interior member 12 so as to have a visually attractive break with the interior member 12 by permitting the locking legs 26 to be passed through the respective locking holes 15 of the alignment means C so as to be locked in place therein.

Consequently, also in the knee protection system S3 according to the third embodiment, the knee protection panel 21A can be disposed at the standby position P0 while providing a visually attractive break from the interior member 12 without deteriorating the mounting work efficiency.

In addition, in the knee protection system S3 of the third embodiment, the engagement portion 51 includes the distally narrowed or tapered side portion 53, and the engagement portion 55 includes the concave portion 55a which is tapered so as to be narrowed as it deepens. Namely, the outer surface of the side portion 53 and the concave portion 55a constitute a guide portion 54 which guides the engagement portions 51, 55 to align their centers O1, O2 when they are brought into engagement with each other. Due to this, even in the event that the knee protection panel 21A is displaced relative to the drive mechanisms 35 when disposed at the standby position P0 prior to the activation of the drive mechanisms 35 to provide a visually attractive break with the interior member 12 with the centers O1, O2 of the engagement portions 51, 55 displaced from each other, when the drive mechanisms 35 are activated, the engagement portions 51, 55 can be aligned by the guide portions 54 such that the centers O1, O2 of the engagement portions 51, 55 coincide with each other. As a result, the knee protection panel 21A is held by the holding portions 38 in the proper position, whereby even in the event that the knee protection panel 21A stops motion of the knees K, the knee protection panel 21A can be held stably, thereby making it possible to protect the knees K properly.

Figure 13:
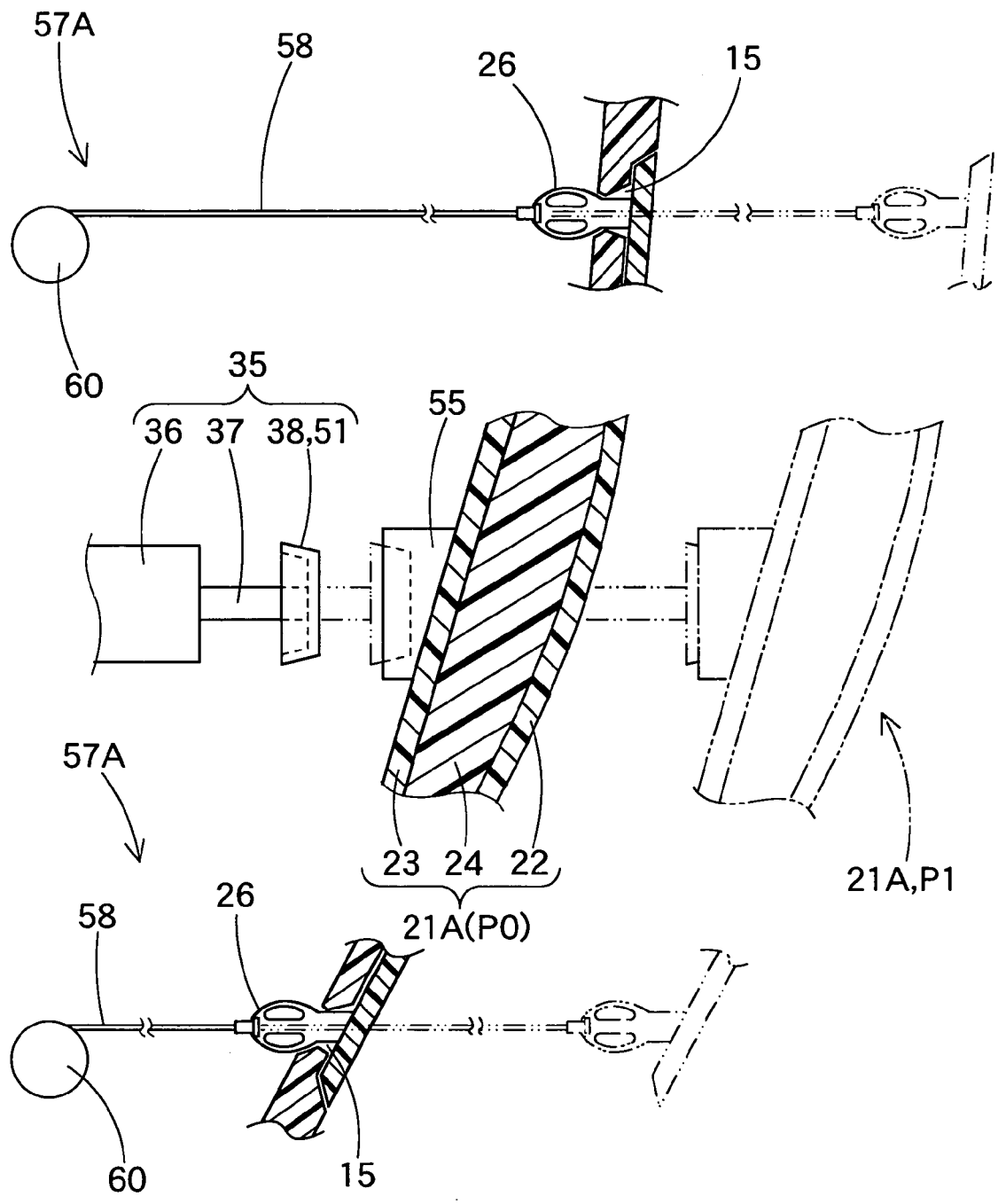
FIG. 13 is a sectional view showing a modified example made to the third embodiment shown in FIG. 10.

Note that the rearward movement restriction member for restricting the rearward movement of the knee protection panel 21A disposed at the protecting position P1 may be the rearward movement restriction member 57A shown in FIG. 13. This rearward movement restriction member 57A is constructed such that a pretensioner 60 is provided in such a manner as to be connected to a shank portion 58. This pretensioner 60 biases the shank portion 58 in such a manner that the shank portion 58 is normally pulled to the front side of the vehicle.

In addition, in the knee protection systems S1, S2, S3 according to the respective embodiments, while the knee protection panels 21, 21A are described as being constructed so as to be prevented from displacing not only vertically but also horizontally when the engagement portions 28, 33, 41, 45, 51, 55 are brought into engagement with each other, in the event that when aligning the knee protection panels with the interior member 12, an assembling error of the knee protection panels 21, 21A relative to the vehicle body side member 1 occurs only in the vertical direction or in the horizontal direction, the knee protection panels 21, 21A may be constructed so as to be prevented from being displaced only in the relevant direction.

Furthermore, in the knee protection systems S1, S2, S3 of the respective embodiments, while the relevant systems are described as being provided in front of the driver's seat, the knee protection systems according to the invention may be provided in front of the front passenger seat.

What is claimed is:

1. A knee protection system for protecting the knees of an occupant of a vehicle which move forward when the vehicle is in collision, comprising:
   a knee protection panel for restraining the knees from moving forward;
   an interior member disposed so as to surround the knee protection panel;
   a drive mechanism for driving the knee protection panel from a standby position surrounded by the interior member to the vehicle rear side, at a protecting position situated in front of the knees of the occupant when the vehicle is in collision;
   a holding portion provided on the drive mechanism for holding the knee protection panel so that the knee protection panel can be moved rearward; and
   engagement portions disposed, respectively, on the holding portion of the drive mechanism and another separate engagement portion disposed on the knee protection panel, and being adapted to be brought into engagement with each other when the engagement portion located on the drive mechanism is moved rearward due to the activation of the drive mechanism, so as to prevent the displacement of the knee protection panel relative to the holding portion, the knee protection panel being displaceable in the vertical and horizontal direction with respect to the drive mechanism before activation of the drive mechanism and is alternatively not displaceable in the vertical and horizontal direction with respect to the drive mechanism after activation of the drive mechanism, once the engagement portions disposed, respectively, on the holding portion of the drive mechanism and the separate engagement portion disposed on the knee protection panel are brought into engagement with each other following activation of the drive mechanism.

2. A knee protection system as set forth in claim 1, wherein the engagement portions disposed at the locations where the holding portion and the knee protection panel connect comprise guide portions which guide the engagement portions to align their centers when the engagement portions are brought into engagement with each other.

3. A knee protection system as set forth in claim 1, wherein the knee protection panel comprises:
   an impact absorbing portion which plastically deforms in such a manner as to reduce the longitudinal thickness; and
   a front surface portion for supporting the impact absorbing portion on the front side of the impact absorbing portion.

4. A knee protection system as set forth in claim 1, comprising alignment means for connecting the knee protection panel to the interior member in such a manner that the rear surface of the knee protection panel is flush with the rear surface of the interior member, wherein
   the alignment means is made up of a plurality of locking legs which protrude forward from the knee protection panel, and
   locking holes formed in the interior member through which the locking legs are passed so as to be locked at the edges thereof.

5. A knee protection system as set forth in claim 1, wherein the engagement portions disposed at the holding portion and the knee protection panel engage with each other in such a manner as to prevent the knee protection panel from being displaced vertically, horizontally, and rearward relative to the holding portion when the engagement portions are brought into engagement with each other.

6. A knee protection system as set forth in claim 1, wherein the engagement portions disposed at the holding portion and the knee protection panel engage with each other in such a manner as to prevent the knee protection panel from being displaced vertically and horizontally relative to the holding portion when the engagement portions are brought into engagement with each other, and
   a rearward movement restriction member is connected to the knee protection panel for preventing rearward displacement of the knee protection panel away from the protecting position.

7. A knee protection system as set forth in claim 6, comprising an alignment means for connecting the knee protection panel to the interior member in such a manner that the rear surface of the knee protection panel is flush with the rear surface of the interior member, wherein the alignment means comprises;
a plurality of locking legs which protrude forward from the knee protection panel, and
locking holes formed in the interior member through which the locking legs are passed so as to be locked at the edges of the interior member, wherein
a rearward movement restriction member for preventing the rearward movement of the knee protection panel away from the protecting position is provided at the front end of each locking leg, wherein
the rearward movement restriction member comprises;
a shank portion which extends forward from the locking leg so as to pass through the locking hole and which has flexibility, and
a separation-preventing portion provided at the front end of the shank portion which can become engaged to the edge of the locking hole, wherein
the drive mechanism comprises a driving rod which moves rearward, wherein
the engagement portion of the holding portion is disposed at a rear end of the driving rod, and wherein
the engagement portion of the knee protection panel comprises a concavity which is made concave to the rear, so that the engagement portion of the holding portion which moves rearward fits in the concavity to thereby prevent the knee protection panel from being displaced vertically and horizontally.

8. A knee protection system as set forth in claim 6, comprising an alignment means for connecting the knee protection panel to the interior member in such a manner that the rear surface of the knee protection panel becomes flush with the rear surface of the interior member, wherein the alignment means comprises;
a plurality of locking legs which protrude forward from the knee protection panel, and
locking holes formed in the interior member through which the locking legs are passed so as to be locked at edges of the interior member, wherein
a rearward movement restriction member for preventing the rearward movement of the knee protection panel disposed at a protecting position is provided at the front end of each locking leg, wherein
the rearward movement restriction member comprises;
a shank portion which extends forward from the locking leg so as to pass through the locking hole and which has flexibility, and
a pretensioner connected to the front end of the shank portion for biasing the shank portion in such a manner that the shank portion is normally pulled forward, wherein
the drive mechanism comprises a driving rod which moves rearward, wherein
the engagement portion of the holding portion is disposed at the rear end of the driving rod, and wherein
the engagement portion of the knee protection panel comprises a concavity which is made concave to the rear, so that the engagement portion of the holding portion which moves rearward fits in the concavity to thereby prevent the knee protection panel from being displaced vertically or horizontally.

9. A knee protection system as set forth in claim 1, wherein the engagement portion of the holding portion or the knee protection panel is formed into a tubular shape and is arranged so that the distal end of the other of the engagement portions is inserted into the tubular holding portion when the knee protection panel is in the standby position, wherein an opening in the engagement portion which is formed into the tubular shape is formed larger than the distal end of the other engagement portion so that the knee protection panel can be displaced at least either in the vertical direction or in the horizontal direction relative to the holding portion in a state in which the engagement portions have not yet been brought into engagement with each other, and wherein
the engagement portion which is formed into the tubular shape has an internal surface of dimensions so that the distal end of the other engagement portion fits into the tubular engagement portion when the engagement portions are in engagement with each other.

10. A knee protection system as set forth in claim 1, wherein the engagement portions at the holding portion and the knee protection panel are formed of fasteners which correspond to each other.

11. A knee protection system as set forth in claim 10, wherein the engagement portion on the knee protection panel side is provided so as to have a larger area than the engagement portion on the holding portion side.

* * * * *